United States Patent [19]

Gerot

[11] 3,881,055

[45] Apr. 29, 1975

[54] CIRCUIT ARRANGEMENT FOR SEPARATING SYNCHRONIZING SIGNALS FROM A VIDEO SIGNAL

[75] Inventor: Guy Jean Cyrille Gerot, Nanterre, France

[73] Assignee: U.S. Philips Corporation, New York, N.Y.

[22] Filed: Sept. 28, 1973

[21] Appl. No.: 401,659

[30] Foreign Application Priority Data

Oct. 23, 1972 France ............................ 72.37496

[52] U.S. Cl. ............................................ 178/7.3 S

[51] Int. Cl. ............................................ H04n 5/08

[58] Field of Search .......... 178/7.3 S, 7.5 S, 5.4 AC, 178/5.4 SD, 5.4 SY

[56] References Cited

UNITED STATES PATENTS

| | | | |
|---|---|---|---|
| 3,706,847 | 12/1972 | Smeulers | 178/7.3 S |
| 3,789,141 | 1/1974 | Ayaki et al. | 178/5.4 SY |

*Primary Examiner*—Robert L. Griffin
*Assistant Examiner*—George G. Stellar
*Attorney, Agent, or Firm*—Frank R. Trifari; Henry I. Steckler

[57] ABSTRACT

A circuit arrangement for separating synchronizing signals from a television signal in which the reference level for a required amplitude selection circuit is obtained with the aid of a matrix network between two balanced amplifier outputs.

Use: in television.

5 Claims, 7 Drawing Figures

CIRCUIT ARRANGEMENT FOR SEPARATING SYNCHRONIZING SIGNALS FROM A VIDEO SIGNAL

The invention relates to a circuit arrangement for separating synchronizing signals from a video signal to be applied to an input of the circuit arrangement and having its black level maintained substantially constant, comprising an amplitude selection circuit having a first input for applying an amplitude selection level and a second input for applying the video signal.

Such a circuit arrangement is known from French Patent Specification No. 1,580,168 in which the amplitude selection circuit is a transistor whose emitter is the first input and whose base is the second input. The video signal is applied through an emitter follower to the amplitude selection circuit.

An object of the invention is to provide a circuit arrangement which is better suitable as an integrated circuit and in which furthermore amplification is possible between the input of the circuit arrangement and the amplitude selection circuit without the location of the selection level being inaccurately influenced.

To this end a circuit arrangement of the kind described in the preamble according to the invention is characterized in that the first input is connected to a tap on a matrix network arranged between two balanced outputs of an amplifier, while the second input is coupled to one of the outputs of the amplifier, an input of the amplifier being connected to the input of the circuit arrangement.

The invention will now be described with reference to the drawing.

In the drawing:

FIG. 1 shows by way of a block-schematic diagram a synchronizing signal separating circuit according to the invention FIG. 2 shows by way of a principle circuit diagram an embodiment of a circuit arrangement according to the invention FIG. 3 shows by way of a circuit diagram an integrated circuit arrangement according to the invention FIG. 4 shows by way of a waveform a video frequency signal which is applied to the input of the circuit of FIG. 2.

Figure 1:
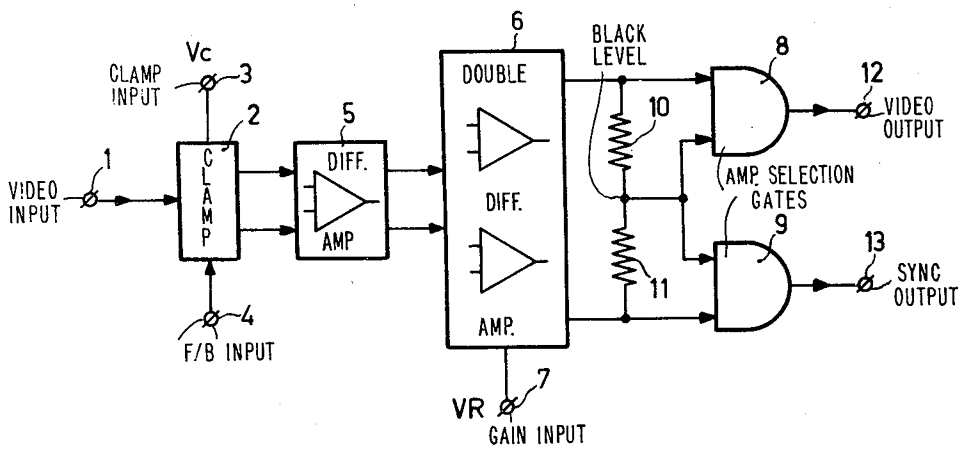

In FIG. 1 an input terminal 1 for a video frequency signal is connected to a clamping circuit 2 which receives a clamping level voltage VC through an input 3 and line flyback pulses through an input 4.

The clamping circuit 2 is furthermore connected to two inputs of a difference amplifier 5 whose outputs are connected to a double difference amplifier 6 which has an input 7 for a gain control voltage VR.

The outputs of the double difference amplifier 6 are each connected to one of the inputs of two amplitude selection circuits 8 and 9 and to a matrix circuit having two resistors 10 and 11. The junction of the resistors 10 and 11 is connected to the two other interconnected inputs of the amplitude selection circuits 8 and 9. The amplitude selection circuits 8 and 9 each have outputs 12 and 13, respectively.

A video signal applied to the input 1 has the black level clamped at the voltage VC by means of line flyback pulses applied to the input 4. The clamped video signal is then applied to the difference amplifier 5 and subsequently to the double difference amplifier 6.

When the two amplifiers of the double difference amplifier 6 receive the same gain control voltage VR, the instantaneous values of the currents in the output conductors are zero and the four inputs of the gates 8 and 9 and the output terminals 12 and 13 convey the same direct voltage corresponding to the black level.

When the bias voltage at one of the amplifiers of the double difference amplifier 6 is changed and is rendered different from VR, the currents in the output conductors of the amplifier 6 show fluctuations in the opposite sense with respect to the black level.

The junction of the resistors 10 and 11 which have equal values and the two interconnected inputs of the gates 8 and 9 convey a constant direct voltage which corresponds to the black level while two video frequency signals of the same amplitude but varying in the opposite sense are applied to the other two inputs of the said gates. Only the part of the video signal ensuring the picture contents during the line scan is then passed by one of the amplitude selection circuits while the other amplitude selection circuit passes the part with the synchronizing pulses.

Figure 2:
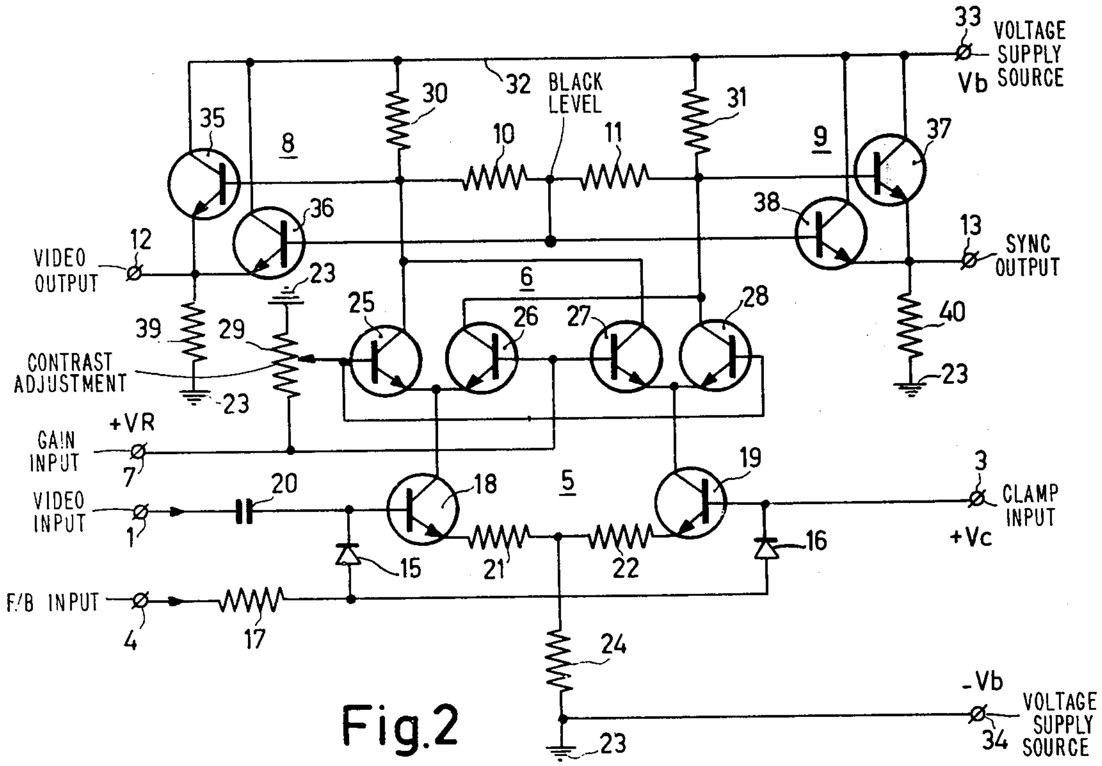

In FIG. 2 in which corresponding components have the same reference numerals as in FIG. 1 the clamping circuit is constituted by two diodes 15 and 16 whose interconnected anodes are connected through a resistor 17 to the input 4 for the line flyback pulses.

The difference amplifier 5 has two npn transistors 18 and 19. The base of the transistor 18 is connected to the cathode of the diode 15 and through a capacitor 20 to the input 1, and that of the transistor 19 is connected to the cathode of the diode 16 and to the input 3.

The emitters of the transistors 18 and 19 are connected together through two resistors 21 and 22 whose junction is connected to ground 23 through a resistor 24.

The double difference amplifier 6 has four npn transistors 25, 26, 27 and 28 whose emitters are pairwise connected to the collectors of the transistors 18 and 19.

The interconnected bases of the transistors 25 and 28 are connected to an adjustable wiper on a potentiometer 29 which serves for adjusting the amplification and which is arranged between ground 23 and the bases of the transistors 26 and 27 connected to the terminal 7.

The interconnected collectors of the transistors 25 and 27 and the interconnected collectors of the transistors 26 and 28 are connected through resistors 30 and 31 and a conductor 32 to the positive terminal 33 of a voltage source Vb whose negative terminal 34 is connected to ground 23. The matrix circuit of the resistors 10 and 11 is arranged between the interconnected collectors of the transistors 25 and 27 and those of transistors 26 and 28.

The amplitude selection circuits 8 and 9 are constituted by two groups of two npn transistors 35, 36 and 37, 38 whose collectors are connected to the conductor 32.

The interconnected emitters of the transistors 35 and 36 are connected through a resistor 39 to ground 23 and furthermore to the output 12 for the luminance signal. The interconnected emitters of the transistors 37 and 38 are connected to ground 23 through a resistor 40 and are connected to the output 13 for the synchronizing pulses. The base of transistors 36 and 38 are two inputs of the selection circuit and are connected to the junction of matrix resistors 10 and 11.

Figure 4:
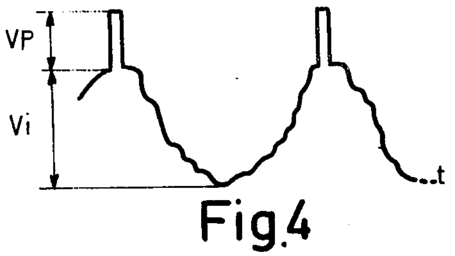
Figure 5:
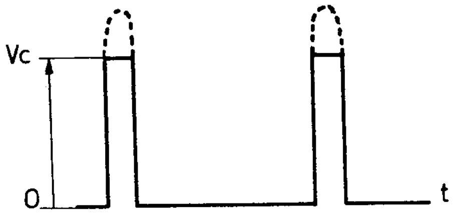
FIG. 5 shows by way of a waveform with the same time scale as that in FIG. 4 the line flyback pulses which are applied to the circuit arrangement of FIG. 2

The circuit arrangement of FIG. 2 operates as follows: the video signal (FIG. 4) having a picture part Vi and a synchronizing part VP is applied to the base of the transistor 18 which constitutes a difference amplifier with the transistor 19. The coupled emitters of this difference amplifier are fed by a constant current. Line flyback pulses (FIG. 5) which are applied to the input 4 ensure a clamping of the black level of the video signal at the value Vc with the aid of the diodes 15 and 16.

The instantaneous collector currents of the transistors 18 and 19 vary in the opposite sense as determined by the video signal. These collector currents pass through the double difference amplifier with the transistors 25, 26 and 27, 28. The current flowing through the transistors 25 and 28 can be varied by operating the potentiometer 29 serving as a contrast adjusting potentiometer. When the wiper on the potentiometer 29 is adjusted on the side of the input 7, the base bias voltages of the four transistors are equal to +VR and the interconnected collectors of the transistors 25, 27 and of the transistors 26, 28 convey direct currents of the same value. The instantaneous video signal currents then have the same value but are opposite to each other and eliminate each other.

When, however, the wiper on the potentiometer 29 is adjusted on the side of ground, currents flow to the collectors which have video signal variations in the opposite sense with respect to the black level.

The voltages which are then produced across the rsistors 30 and 31 are combined by the resistors 10 and 11 of equal values and are applied to the bases of the transistors 35 and 37 which constitute the first inputs of the amplitude selection circuits 8 and 9 (FIG. 1). The two other inputs of the amplitude selection circuits are constituted by the interconnected bases of the transistors 36 and 38 which are furthermore connected to the junction of the matrix resistors 10 and 11.

This junction of the resistors 10 and 11 and of the bases of the transistors 36 and 38 are therefore always maintained at a direct voltage which corresponds to the black level in the video signal and which is also independent of the adjustment of the potentiometer 29.

Figure 6:
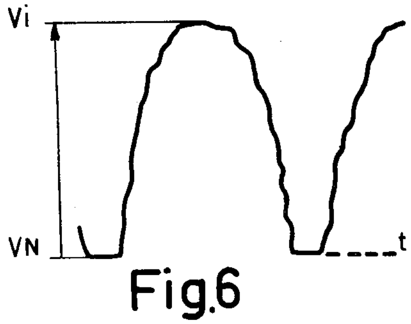
FIG. 6 shows by way of a waveform the image signal which is obtained at one of the outputs of the circuit arrangement of FIG. 2
Figure 7:
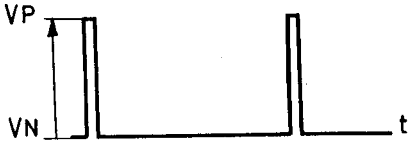
FIG. 7 shows by way of a waveform the synchronizing pulses which are obtained at a further output of the circuit arrangement of FIG 2.

When the potentiometer 29 is adjusted in such a manner that the video signal voltages across the resistors 30 and 31 are not zero, these voltages which are of opposite polarity are applied to the bases of the transistors 35 and 37. The emitters thereof are interconnected to the emitters of the transistors 37 and 38 which receive the voltage corresponding to the black level at their bases. As a result only signals are applied at the terminals 12 and 13 which are more positive than the black level voltage VN (FIGS. 6 and 7) so that the luminance signal Vi is applied to the output 12 and the synchronizing signal VP is applied to the output 13.

When the potentiometer 29 is adjusted at contrast zero the outputs 12 and 13 only supply a direct voltage which corresponds to the black level. The adjustment of the potentiometer 29 to another position results in luminance signals being applied to the output 12 and synchronizing signals being applied to the output 13.

It will be evident that a circuit arrangement is also possible in which no amplitude adjustment is used and in that case optionally only a single difference amplifier may be sufficient.

Figure 3:
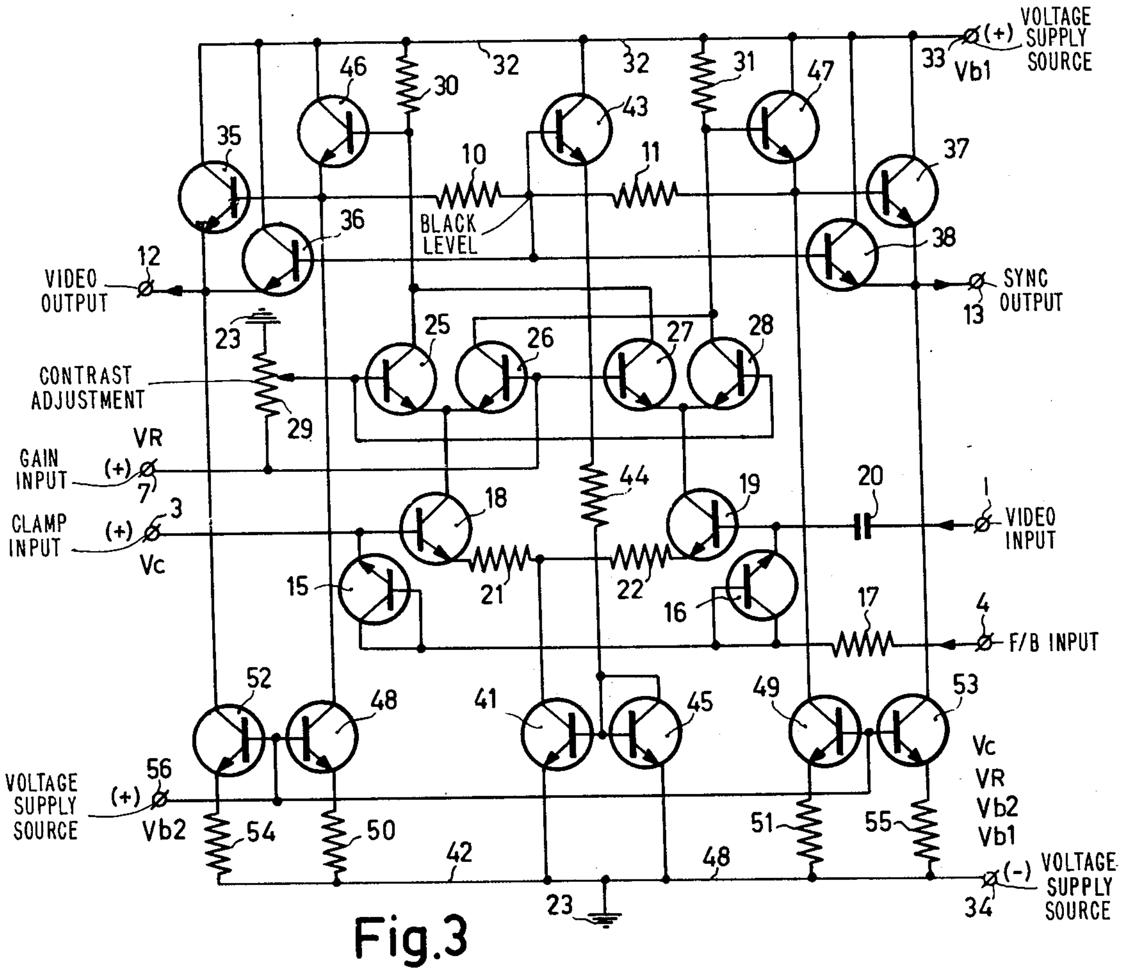

In FIG. 3 in which corresponding components have the same reference numerals as in FIGS. 1 and 2 the common emitter resistor 24 of the circuit diagram of FIG. 2 is replaced by an npn transistor 41 whose collector is connected to the common point of the resistors 21 and 22 and whose emitter is connected to a conductor 42 connected to ground 23.

The base of npn feedback transistor 43 is connected to the central tap on the resistors 10 and 11, the collector being directly connected to the conductor 32. The emitter of the transistor 43 is connected to the conductor 42 through a resistor 44 and a diode 45 which is constituted by an npn transistor whose collector and base are connected together and to the base of the transistor 41.

In the same manner the clamping diodes 15 and 16 constituted by npn transistors whose collectors and bases are connected together.

Two impedance adapter transistors 46 and 47 of the npn type whose collectors are connected to the conductor 32 and whose emitters are each connected to a base of the transistors 35 and 37 are arranged between the interconnected collectors of the transistors 25, 27 and the transistor 35 on the one hand and between the interconnected collectors of the transistors 26, 28 and the transistor 37 on the other hand. The emitter loads of the transistors 46 and 47 are constituted by npn transistors 48 and 49 whose emitters are connected through two resistors 50 and 51 to the conductor 42. The common load resistors 39 and 40 of FIG. 2 of the emitters of the transistors 35, 36 and 37, 38 are replaced by two npn transistors 52 and 53 whose emitters are connected to the negative conductor 42 through resistors 54 and 55, respectively. The base of the transistors 48, 49, 52 and 53 are connected to the positive terminal 56 of a voltage source Vb2 whose negative terminal is connected to ground 23.

The modifications of the circuit arrangements of FIG. 3 as an integrated circuit with respect to the principle circuit diagram of FIG. 2 are intended to obtain a still better operation of the circuit arrangement. The transistor 41 provides for the constant current for the difference amplifiers while the transistors 48, 49 on the one hand and 52, 53 on the other hand maintain the current of the impedance adapter transistors 46 and 47 and the amplitude selection circuits 35, 36 and 37, 38 constant.

The transistor 45 arranged as a diode is provided for stabilising the black level voltage of the terminals 12 and 13 with a negative feedback loop between the voltage on the junction of the resistors 10 and 11 and the current source transistor 41. A possible variation of the voltage on this point causes a variation of the current of the transistor 41 which in turn causes a counteracting voltage variation at the matrix network.

An integrated circuit optionally included outside the circuit arrangement of FIG. 3 and connected to the output 13 may make a control voltage of the separated synchronizing pulses, which depends on the amplitude of the separated synchronizing pulses and which may serve to adapt the colour saturation to the adjustment contrast.

When the circuit arrangement is used without omission of the potentiometer 29 as a synchronising signal separator the contrast potentiometer 29 may be provided with a series resistor so as to prevent the amplitude of the signals at the outputs 12 and 13 from becoming zero when the said potentiometer is operated.

Furthermore it will be evident that the black level of the video signal at the input of the circuit arrangement may be maintained in a different manner such as, for example, with the aid of an automatic control circuit.

If, for some reason or other, the resistors 30 and 31 must be chosen to be unequal in value, the values of the resistors of the potential divider 10, 11 may be adapted accordingly.

What is claimed is:

1. A method comprising supplying out of phase signals from a composite signal including video and synchronization components, and providing the black level of said composite signal by matrixing said out of phase signals, and providing separated video and synchronization components by amplitude selecting said black level and out of phase signals.

2. A circuit comprising input means for receiving a composite signal including video and synchronization components, an amplifier having an input coupled to said input and a pair of balanced output means for supplying out of phase signals, a matrix network coupled to said output means and having a tap and an amplitude selection circuit having a first input pair coupled to said output means, second input coupled to said tap, first output means for supplying said synchronization component, and a second output means for supplying said video component.

3. A circuit as claimed in claim 2, wherein the matrix network comprises two series coupled resistors having equal values.

4. A circuit as claimed in claim 2, wherein the amplifier comprises a gain controllable double difference amplifier, and further compirising a difference amplifier coupled between said input means and said amplifier input.

5. A circuit as claimed in claim 4, wherein said double difference amplifier comprises transistors having collectors, and a transistor emitter follower coupled between each of the collectors of the transistors of the double difference amplifier and the first inputs of the amplitude selection circuits.

* * * * *